United States Patent [19]

Sherman et al.

[11] Patent Number: 5,602,436
[45] Date of Patent: Feb. 11, 1997

[54] MOTOR STARTING SWITCH WITH ADJUSTABLE RUNNING CLEARANCE

[75] Inventors: Jeffrey S. Sherman; Raymond D. Heilman, both of St. Louis, Mo.

[73] Assignee: Emerson Electric, Co., St. Louis, Mo.

[21] Appl. No.: 636,846

[22] Filed: Apr. 19, 1996

Related U.S. Application Data

[63] Continuation of Ser. No. 130,662, Oct. 1, 1993, abandoned.

[51] Int. Cl.$^6$ .................................................... H02K 11/00
[52] U.S. Cl. .................. 310/68 E; 310/68 A; 310/68 B; 310/77
[58] Field of Search ................................. 310/68 E, 68 R

[56] References Cited

U.S. PATENT DOCUMENTS

| | | | |
|---|---|---|---|
| 2,538,410 | 1/1951 | Bretch | 310/68 E |
| 3,271,602 | 9/1966 | Waters | 310/68 E |
| 3,582,741 | 6/1971 | Arnold et al. | 318/209 |
| 3,609,421 | 9/1971 | Hildebrandt et al. | 310/68 E |
| 4,205,245 | 5/1980 | Hildebrandt et al. | 310/68 E |
| 4,208,559 | 6/1980 | Gray | 200/329 |
| 4,240,001 | 12/1980 | Hildebrandt et al. | 310/68 E |
| 4,242,607 | 12/1980 | Hildebrandt et al. | 310/68 E |
| 4,289,988 | 9/1981 | Schaeter | 310/68 E |
| 4,296,366 | 10/1981 | Hildebrandt et al. | 318/793 |
| 4,336,472 | 6/1982 | Czech | 310/68 E |
| 4,386,290 | 5/1983 | Monette | 310/68 E |
| 4,661,732 | 4/1987 | Gehrt | 310/68 E |
| 5,153,471 | 10/1992 | Ottersbach | 310/68 E |
| 5,293,090 | 3/1994 | Heilman et al. | 310/68 E |

Primary Examiner—Thomas M. Dougherty
Assistant Examiner—Elvin G. Enad
Attorney, Agent, or Firm—Polster, Lieder, Woodruff & Lucchesi

[57] ABSTRACT

A dynamoelectric machine of the present invention includes a stator, a rotor journaled with respect to the stator, and a rotor shaft having a longitudinal axis extending axially from said rotor. An auxiliary winding and a starting switch operable to de-energize said auxiliary winding upon the motor obtaining a predetermined speed is provided. A centrifugal actuator is mounted on the rotor shaft to actuate the starter switch to de-energize the starter windings when the rotor obtains a predetermined speed. The rotor shaft has a single wide groove formed thereon and the actuator has a sleeve which is journaled on the rotor shaft. The sleeve has an inwardly directed projection sized and shaped to fit in the shaft groove. The sleeve projection and shaft groove interact such that the actuator sleeve cannot be moved relative to the shaft and the switch without a great deal of force. Shims, in the form of brake liners, are provided to place an actuator face of the actuator within a predetermined distance of the switch. This construction provides a proper running clearance between the face and the switch which is very difficult to change.

10 Claims, 2 Drawing Sheets

MOTOR STARTING SWITCH WITH ADJUSTABLE RUNNING CLEARANCE

This is a continuation application of application Ser. No. 08/130,662, filed on Oct. 1, 1993 now abandoned.

BACKGROUND OF THE INVENTION

This invention relates to a switch for a dynamoelectric machine, and in particular, to a starting switch for a fractional horsepower induction electric motor.

Typically, capacitor start and split phase induction motors have a run winding and a starting or auxiliary winding placed in winding receiving slots provided in the bore of the stator core of the motor. The starting winding is energized during start up of the motor (or when the speed of the motor falls below a specified operating speed) so as to create a rotating field in the stator and to apply sufficient torque to the rotor for starting purposes. Once the motor has accelerated to a desired operating speed (e.g., about 80% or more of the normal operating speed of the motor), the rotor is able to follow the alternations of the magnetic field created by the run windings, and the starting winding is no longer needed and is de-energized. Typically, the starting winding is not intended for continuous use and may fail if not de-energized during normal operation of the motor.

As is conventional, motor starting switches are provided in the motor for energizing the starting winding only during startup of the motor and for de-energizing the starting winding once the motor has attained its desired operating speed. These motor starting switches are generally actuated by a centrifugal actuator mounted on and rotatable with the rotor shaft of the motor. The centrifugal actuator is responsive to the speed of the motor and actuates the starting switch from its start to its run position in response to the motor attaining a predetermined operating speed.

Centrifugal actuators typically include an actuator member movable axially on the rotor shaft from an off or stop position when the motor is stopped (or is operating below a specified operation speed) to a run position when the motor is accelerated to a predetermined operating speed. Typically, an actuator linkage operatively interconnects the motor starting switch and the actuator member of the centrifugal actuator. This linkage may include a lever interconnecting the switch and actuator member, a spring, and means for adjusting the lever with respect to the actuator. In some instances, the lever is pivoted on a portion of the motor itself, for example on the end shield of the motor.

Because the actuator member of the centrifugal actuator moves only a limited distance between its off and run positions, it has heretofore been necessary to accurately adjust the relative positions of the motor starting switch and the centrifugal actuator to ensure that the switch is properly actuated by the centrifugal actuator at a specified motor operating speed. However, relative positions of the actuator and the switch are often accidentally changed when repairs are made upon the motor in the field. Because the tolerances are tight, a slight change in the relative position of the actuator and switch can cause the switch to operate improperly, causing damage to the starting winding. Depending on the direction of misplacement between the actuator and the switch, the starting winding may not be able to be de-energized or the winding may not be initially energized. In the former, the starting winding will run continuously, causing premature failure of the starting winding. In the latter condition, the motor may not be able to be started in the first instance.

It is therefor one object of the present invention to provide a starting switch actuator for a dynamoelectric machine.

Another object is to provide such an actuator in which the clearance between the actuator and the switch is difficult to alter.

Another object is to provide such an actuator that is economical to produce.

These and other objects will become apparent to those skilled in the art upon a review of the following disclosure and accompanying drawings.

SUMMARY OF THE INVENTION

Briefly stated, a dynamoelectric machine of the present invention includes a stator, a rotor journaled with respect to the stator, a rotor shaft having a longitudinal axis extending axially from said rotor, a main winding, and an auxiliary winding. A starting switch operates to de-energize the auxiliary winding when the machine obtains a predetermined speed. A centrifugal actuator is mounted on the rotor shaft to rotate therewith. It is operatively connected to the starting switch to actuate the switch when the rotor obtains its predetermined speed. The centrifugal actuator includes a sleeve mounted on said shaft and a switch engaging member journaled on the sleeve for axial movement with respect to the sleeve. The switch engaging member has a circular flange at its top. A centrifugal weight urges a face of the flange axially along the shaft to engage a contact to actuate the switch when the predetermined speed is reached. So that the switch is actuated at the appropriate speed, the face and contact are spaced apart a predetermined distance. This distance forms a running clearance.

The shaft has a single wide groove formed therein. The groove has walls that are generally perpendicular to the axis of the shaft. The sleeve of the actuator has a nose or projection which is sized and shaped to be received in the shaft groove. The size and shape of the shaft groove and the sleeve projection, and the interaction between them firmly holds the sleeve in place on the shaft. The sleeve cannot be moved relative to the shaft without a great deal of force. Shims, in the form of brake liners, are provided on the actuator flange to create the appropriate running clearance between the actuator flange and the switch contact. As can be appreciated, this assembly provides an actuator which cannot be easily moved. The running clearance cannot, therefore, be easily changed.

DESCRIPTION OF THE PREFERRED EMBODIMENT

Figure 1:
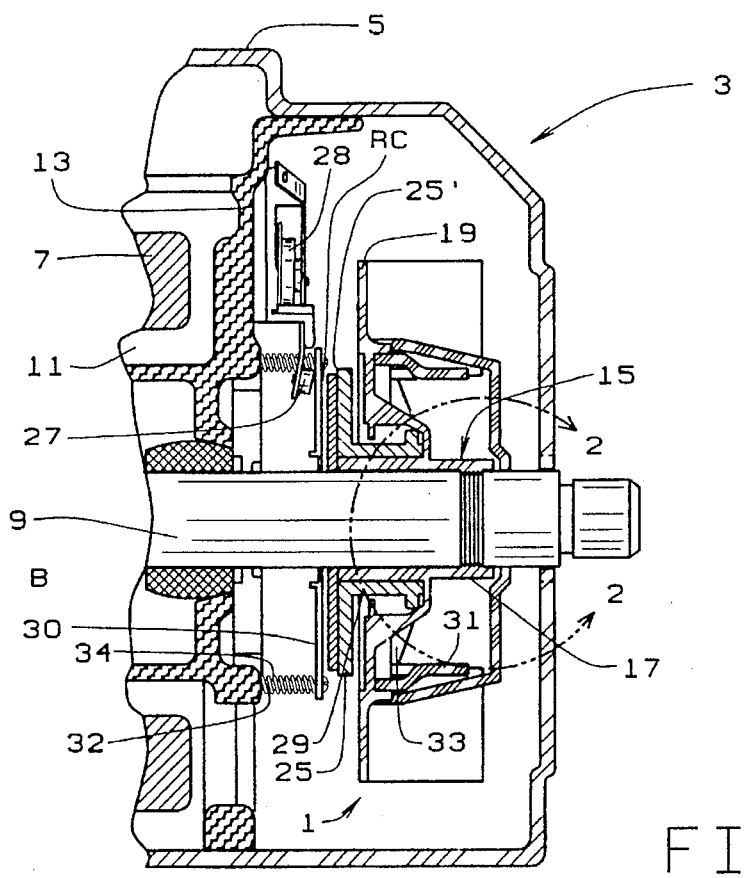
FIG. 1 is a cross-sectional view of a prior art actuator switch mounted on a shaft of a dynamoelectric machine.
Figure 2:
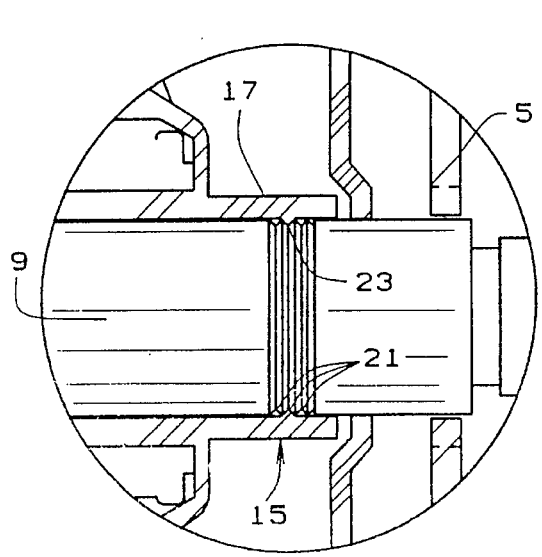
FIG. 2 is an enlarged sectional view of the prior art actuator taken along line 2—2 of FIG. 1.
Figure 3:
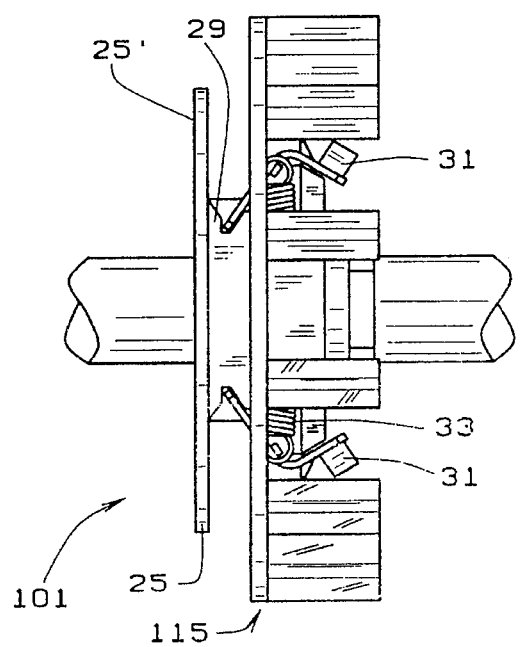
FIG. 3 is a side elevational view of an actuator of the present invention mounted on a shaft.
Figure 4:
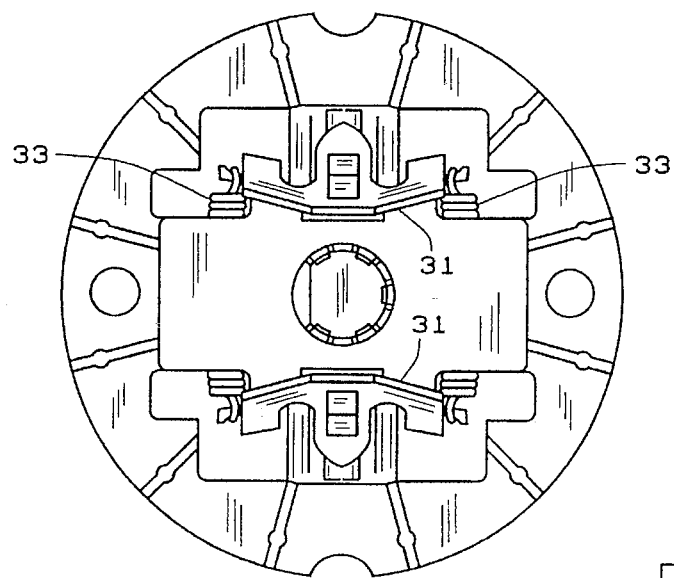
FIG. 4 is a top plan view of the actuator.
Figure 5:
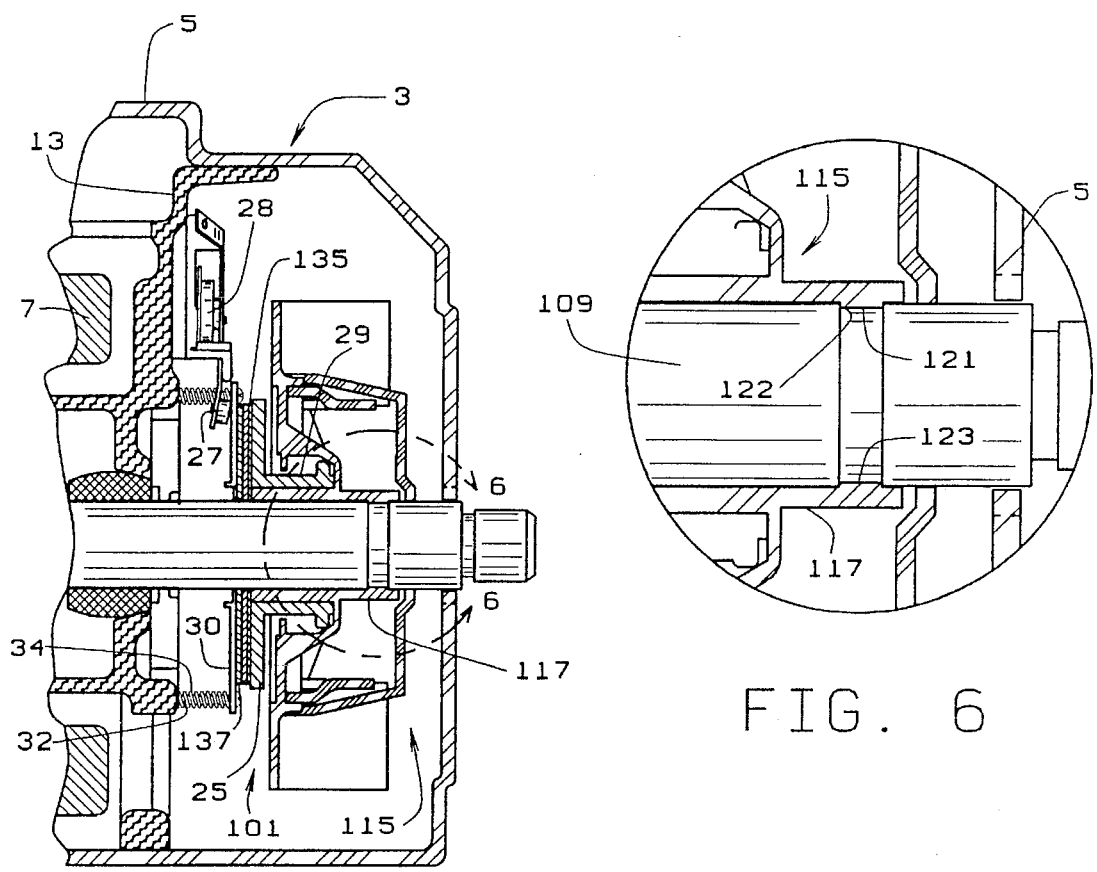
FIG. 5 is a cross-sectional view of the actuator.
Figure 6:
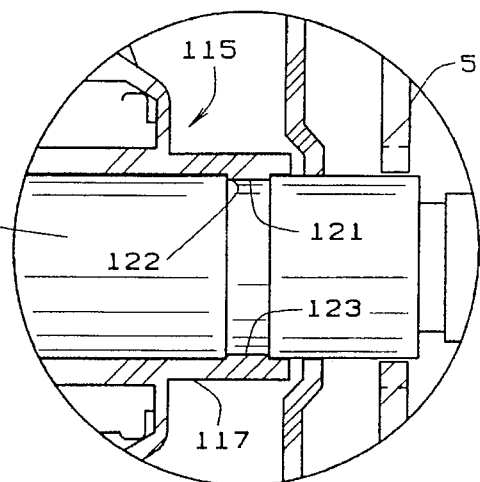
FIG. 6 is an enlarged sectional view taken along lines 6—6 of FIG. 5.

A prior art centrifugal actuator 1 is shown in FIG. 1 positioned in a motor assembly 3. Motor assembly 3 conventionally includes a shell 5 housing a stator 7, a rotor (not shown), and a rotor shaft 9 which extends axially outward of a core 11 of stator 7 through an end shield 13. The shaft 9 is mounted for rotation along a bearing B. Actuator 1 is mounted to rotor shaft 9 outside of shell 5 to rotate with rotor 9.

Actuator 1 includes a main body 15 having a tubular sleeve 17 which surrounds shaft 9 and a circumferential generally circular flange 25. Shaft 9 and sleeve 17 are shaped so that actuator 1 will rotate with shaft 9. Shaft 9 has a plurality of generally triangular grooves 21 which receive a generally triangular finger 23 extending radially inwardly from sleeve 17. Finger 23 is placed in one of the grooves 21 so that a face 25' of actuator flange 25 is properly positioned with respect to an arm 27 of a switch 28 and a table 30. As is conventional, actuator flange 25 extends outwardly from a sleeve 29 slidably journaled on sleeve 17 to move axially with respect to shaft 9. A weight 31 is pivotally mounted on body 15 and operatively connected to sleeve 29 such that sleeve 29 will move axially along sleeve 17 toward table 30 as weight 31 is pivoted outwardly. Weight 31 is biased to a normally inward position by a spring 33.

Table 30 is mounted on shaft 9 a predetermined distance from face 25'. A pair of pegs 32 extend between the table 32 and end shield 13. Table 30 can move axially with respect to pegs 32. Springs 34 are placed on pegs 32. Springs 34 extend between the bottom of table 30 and end shield 13. The table 30 engages contact 27 of switch 28 and spring 34 biases table 30 normally away from contact 27 toward flange 25 so that the switch is not normally closed.

When the rotational rate of shaft 9 reaches a predetermined speed, weights 31 pivot outwardly to move flange 25 along sleeve 17 to engage table 30. Table 30 is then urged downwardly to depress contact 27 and actuate switch 28 to disengage the starter winding. So that the switch 28 is actuated at the appropriate speed, face 25' and table 30 are spaced a predetermined distance, to define a running clearance RC. Finger 23 is placed in the appropriate groove 21 so that the running clearance RC is appropriately set. Running clearance RC must be maintained within a close tolerance if the starting windings are to be de-energized. If finger 23 of body 15 is inadvertently moved to a different groove 21, the running clearance will be altered and switch 28 may not be actuated, causing a premature failure of the starter winding. Because of the configuration of groove 21 and finger 23, the position of sleeve 17 on shaft 9 is changed fairly easily. Thus, the running clearance is easily changed.

An actuator 101 of the present invention is shown in FIGS. 3–6. Actuator 101 has a main body 115 having a sleeve 117 which is rotatably fixed to a shaft 109 of motor assembly 3. Shaft 109 has a single wide groove 121 which receives a wide finger 123 which extends radially inwardly from body sleeve 117. Groove 121 is relatively deep and has walls 122 which are generally perpendicular to the axis of shaft 109. Finger 123 is generally rectangular in cross-section to be shaped complementary to groove 121. It may have a slightly angled side to facilitate in the mounting of the sleeve onto the shaft during production of the motor assembly. The dimensions of groove 121 and finger 123 are such that body 115 cannot be moved on shaft 109 without the use of a great force. It cannot, therefore, be accidentally moved as in the case with the prior art body of FIG. 1. The use of a single groove in shaft 1091 rather than a plurality of spaced grooves, substantially reduces manufacturing difficulty and cost.

To create a proper running clearance 137, a brake lining or brake pad 135 is placed between flange 25 and table 30 to act as a shim. Brake lining 135 is actually one or more discs of predetermined width which are combined to produce a running clearance 137 that is within predetermined tolerances. The use of brake lining 135 provides greater leeway in the placement and dimension tolerances of groove 121. Again, this adds to a reduction in the manufacturing costs. As will be appreciated by those skilled in the art, brake pad 135 is used to stop motor rotor rotation quickly, upon removal of power to the motor. We have determined, as described above, that the brake pads themselves may additionally function as shims, by using loose, i.e., non-attached parts, which permit the shimming function without degradation of the braking function.

As can be appreciated, the structure of body 115 and its interaction with shaft 109 provides an assembly which cannot be easily moved along the shaft. The use of the brake pad shims 135 with this assembly provides an assembly which will maintain the running clearance at the desired distance. The assembly 101 is therefore not likely to fail due to an inability of the actuator to actuate switch 28 as long as it is properly protected from the environment.

Numerous variations, within the scope of the appended claims, will be apparent to those skilled in the art in light of the foregoing description and accompanying drawings. These variations are merely illustrative.

Having thus described the invention, what is claimed and desired to be secured by Letters Patent is:

1. A dynamoelectric machine having
 a stator, said stator including a main winding and an auxiliary winding, a rotor rotatably journaled with respect to the stator, and a rotor shaft having a longitudinal axis extending axially from said rotor;
 a starting switch operable to de-energize said auxiliary winding upon the motor obtaining a predetermined speed; and
 a centrifugal actuator mounted on said rotor shaft and operatively connected to said starting switch for actuation of said switch in response to said rotor obtaining said predetermined speed; said centrifugal actuator including:
 a sleeve journaled on said shaft for rotation therewith;
 a switch engaging member slidably journaled on said sleeve for axial movement with respect to said sleeve, said switch engaging member having a circular flange at a top thereof, said flange having an upper surface; and
 a contact which is engaged by said switch engaging member when said motor obtains said predetermined speed, said contact being spaced a predetermined distance from said switch engaging member flange;
 a single radially inwardly projecting finger of a predetermined shape on said sleeve and a single corresponding groove in said shaft, said groove being correspondingly shaped to said single finger and receiving said finger, said finger and groove cooperating to prevent inadvertent longitudinal movement of said sleeve with respect to said shaft to maintain said distance between said contact and said switch engaging member; and
 a brake for stopping rotation of said rotor upon the removal of power to the dynamoelectric machine, said brake functioning as a shim, said brake including a plurality of loose, with respect to each other and said actuator, non-attached parts positioned adjacent said flange.

2. The dynamoelectric machine of claim 3 wherein said groove has walls which are generally perpendicular to the longitudinal axis of said shaft.

3. The dynamoelectric machine of claim 1, wherein said distance maintaining means further comprises at least one shim of a predetermined thickness mounted on said flange of said switch engaging member.

4. The dynamoelectric machine of claim 3 wherein said shim comprises a brake pad.

5. The dynamoelectric machine of claim 1 wherein said finger and groove are generally rectangle in cross-section.

6. The dynamoelectric machine of claim 1 including a table mounted about said shaft a predetermined distance from said upper surface of said circular flange, said table being mounted in said dynamoelectric machine to be movable axially relative to said shaft; said brake comprising a brake pad secured to said flange, between said flange and said table, said brake pad contacting said table upon removal of power to said dynamoelectric machine to stop rotation of said rotor.

7. The dynamoelectric machine of claim 6 wherein said brake pad comprises a shim, said brake pad being sized to provide said predetermined distance between said contact and said switch engaging member flange.

8. A centrifugal actuator for use with a dynamoelectric machine having a stator, a rotor, a shaft extending axially from said rotor, a main winding and an auxiliary winding; said actuator being mounted to said shaft to engage a contact to actuate a switch to de-energize said auxiliary winding when said rotor reaches a predetermined rotational speed, said shaft including a single annular groove extending around said shaft, said groove being generally rectangular in cross-section; said actuator including a hollow tubular sleeve fixed to said shaft, a single finger extending radially inwardly from an inner surface of said sleeve to be received in said shaft groove, said finger being generally rectangular in cross-section to create an interference fit with said shaft groove to substantially prevent axial movement of said sleeve relative to said shaft, a table journaled about said sleeve for axially movement along said sleeve, and at least one shim of a predetermined thickness to provide a desired running clearance between said table and a switch contact; said shim acting to stop rotation of said rotor upon removal of power to the motor, said shim including a plurality of non-attached pans which are loose with respect to one another and which permit the loose non-attached parts to perform a shimming function without degradation of a braking function.

9. A dynamoelectric machine comprising:

a stator assembly, said stator assembly including a stator core, said core having a main winding and an auxiliary winding positioned along the core;

a rotor assembly, said rotor assembly including a rotor core and a rotor shaft, said rotor assembly having a longitudinal axis, said shaft extending outwardly of said rotor along said axis, said rotor assembly being rotatably mounted with respect to said stator assembly along said shaft, said shaft having a single groove; a sleeve journaled on said shaft for rotation therewith; a single radially inwardly projecting finger of a predetermined shape on said sleeve, said groove correspondingly shaped to said single finger and receiving said finger;

a starting switch electrically associated with said stator assembly and operable to de-energize said auxiliary winding upon the rotor assembly obtaining a predetermined speed; and a centrifugal actuator mounted on said shaft, said centrifugal actuator operably connected to said starting switch to de-energize said auxiliary winding upon the rotor assembly obtaining said predetermined speed; said centrifugal actuator including said sleeve, a switch engaging member slidably journaled on said sleeve for axial movement with respect to said sleeve, said switch engaging member having a circular flange at a top thereof, and a contact which engaged by said switch engaging member when said motor obtains said predetermined speed, said contact being spaced a predetermined distance from said switch engaging member flange, said predetermined distance defining a running clearance; and a brake for stopping rotation of said rotor upon the removal of power to the dynamoelectric machine, said brake including a plurality of discs of predetermined thicknesses which function to create said running clearance and which are made of non-attached pans which are loose with respect to one another to permit a shimming function without degradation of a braking function.

10. The dynamoelectric machine of claim 9 wherein said flange of said centrifugal actuator has an upper surface opposite said switch engaging member, said brake comprising a shim made of a brake pad secured to said flange upper surface.

* * * * *

UNITED STATES PATENT AND TRADEMARK OFFICE
CERTIFICATE OF CORRECTION

PATENT NO.  : 5,602,436
DATED       : February 11, 1997
INVENTOR(S) : Jeffrey S. Sherman; Raymond D. Heilman It is certified that error appears in the above-indentified patent and that said Letters Patent is hereby corrected as shown below:

In Claim 8, Col. 5, line 42, after the word "non-attched" replace the word "pans" with the word ---parts---.

In Claim 9, Col. 6, line 8, delete the word ---single---.
In line 10, delete the word ---single---.
In line 27, between the words "which engaged", insert the word ---is---.

Signed and Sealed this

Sixth Day of January, 1998

Attest:

BRUCE LEHMAN

Attesting Officer

Commissioner of Patents and Trademarks